(12) United States Patent
Nakamura et al.

(10) Patent No.: US 9,121,482 B2
(45) Date of Patent: Sep. 1, 2015

(54) MULTI-SHAFT DRIVE DEVICE

(75) Inventors: Takeshi Nakamura, Yokohama (JP); Masahiro Oda, Yokohama (JP); Kenichi Katsube, Yokohama (JP); Ryohei Shigematsu, Yokohama (JP); Shinji Iino, Yokohama (JP)

(73) Assignee: NHK SPRING CO., LTD., Yokohama-Shi (JP)

( * ) Notice: Subject to any disclaimer, the term of this patent is extended or adjusted under 35 U.S.C. 154(b) by 0 days.

(21) Appl. No.: 14/001,849

(22) PCT Filed: Jan. 26, 2012

(86) PCT No.: PCT/JP2012/051713
§ 371 (c)(1),
(2), (4) Date: Aug. 27, 2013

(87) PCT Pub. No.: WO2012/117781
PCT Pub. Date: Sep. 7, 2012

(65) Prior Publication Data
US 2013/0327166 A1 Dec. 12, 2013

(30) Foreign Application Priority Data
Feb. 28, 2011 (JP) .................................. 2011-042125

(51) Int. Cl.
*F16H 19/08* (2006.01)
*B60N 2/02* (2006.01)
*F16H 37/06* (2006.01)

(52) U.S. Cl.
CPC .............. *F16H 19/08* (2013.01); *B60N 2/0232* (2013.01); *B60N 2/0296* (2013.01); *B60N 2002/0236* (2013.01); *F16H 37/065* (2013.01); *Y10T 74/188* (2015.01)

(58) Field of Classification Search
CPC ............... F16H 1/16; F16H 1/12; F16H 1/22; F16H 25/18; F16H 37/06; B60N 2/44; B60N 2/02; B60N 2/06; B60N 2/22

USPC ................. 74/89, 89.13, 89.14, 89.19, 89.27, 74/89.28, 665 F, 665 B, 665 GB, 664, 423; 297/344.1, 344.11–344.13, 344.15, 297/344.17, 344.23
See application file for complete search history.

(56) References Cited

U.S. PATENT DOCUMENTS 2,236,464 A * 3/1941 Burns .............................. 72/248
2,931,424 A * 4/1960 Pickles ......................... 248/419
(Continued)

FOREIGN PATENT DOCUMENTS

JP 54-41898 U 12/1979
JP 62-203834 A 9/1987
(Continued)

OTHER PUBLICATIONS

Office Action issued Nov. 27, 2014 in corresponding Korean Application No. 10-2013-7025545 applying Utility Model Registration No. 1344775.
Office Action issued Apr. 27, 2015 in corresponding Chinese Application No. 201280010655.6.

*Primary Examiner* — William Kelleher
*Assistant Examiner* — Jude Agendia
(74) *Attorney, Agent, or Firm* — Knobbe Martens Olson & Bear LLP

(57) ABSTRACT

A power transmission member that transmits rotation of an output shaft to a movable mechanism achieves a simpler structure and increased productivity compared to when a conventional flexible cable is employed. Out of plural output portions 30 of a clutch unit 2, power transmission members that transmit rotation of an output shaft 31 to a movable mechanism are configured by a conventional torque cable in a second output portion 30B and a third output portion 30C. However in a first output portion 30A, the power transmission member is configured by a gearbox 3 including a worm 71 that is coaxially and integrally formed with an output shaft 31A.

10 Claims, 9 Drawing Sheets

(56) References Cited

U.S. PATENT DOCUMENTS

| | | | |
|---|---|---|---|
| 5,159,854 A * | 11/1992 | Mino et al. | 74/810.1 |
| 5,163,734 A * | 11/1992 | Hakansson | 297/330 |
| 6,050,641 A * | 4/2000 | Benson | 297/284.4 |
| 6,126,132 A * | 10/2000 | Maue | 248/429 |
| 6,626,064 B1 * | 9/2003 | Maue et al. | 74/665 F |
| 6,763,738 B1 * | 7/2004 | Tsutsui et al. | 74/388 PS |
| 7,360,471 B2 * | 4/2008 | Lavoie et al. | 74/724 |
| 7,770,972 B2 * | 8/2010 | Popa | 297/284.4 |
| 2004/0210365 A1 * | 10/2004 | Tanaka et al. | 701/41 |
| 2007/0102228 A1 * | 5/2007 | Shiina et al. | 180/444 |
| 2008/0041187 A1 | 2/2008 | Lavoie et al. | |
| 2013/0255441 A1 * | 10/2013 | Hirata et al. | 74/665 GB |

FOREIGN PATENT DOCUMENTS

| | | |
|---|---|---|
| JP | 3-501832 A | 4/1991 |
| JP | 11-20724 A | 1/1999 |
| JP | 11-263154 A | 9/1999 |

* cited by examiner

MULTI-SHAFT DRIVE DEVICE

CROSS-REFERENCE TO RELATED APPLICATIONS

This application is the U.S. National Phase under 35. U.S.C. §371 of International Application PCT/JP2012/051713, filed Jan. 26, 2012, which claims priority to Japanese Patent Application No. 2011-042125, filed Feb. 28, 2011. The disclosures of the above-described applications are hereby incorporated by reference in their entirety. The International Application was published under PCT Article 21(2) in a language other than English.

TECHNICAL FIELD

The present invention relates to a multi-shaft drive device that is preferably provided for example to a vehicle seat and that selectively drives plural movable mechanisms with a single motor.

BACKGROUND ART

Many vehicle seats are of a type enabling position adjustment of plural portions so as to suit the build and posture of an occupant, the position adjustment includes, for example, sliding the overall seat in the front-rear direction, moving the height of the seat face up and down, or reclining the seatback (backrest). Such adjustment of the plural movable portions may be performed manually, however more convenient electric seats are provided that use the drive of a motor to perform adjustments.

In order to independently drive respective movable portions, a configuration wherein motors are individually coupled to respective drive shafts that are each coupled to a movable portion may be considered, however this would increase the number of motors. Since it is more efficient for a single motor to drive plural output shafts, proposals have been made wherein the power of a motor is transmitted through clutches to respective output shafts coupled to the plural movable portions, and each of the movable portions is selectively driven by connecting and disconnecting the clutches (see for example Japanese National-Phase Publication No. H3-501832). In such multi-shaft drive devices, rotation of each of the output shafts is transmitted to drive shafts of the movable locations through flexible cables.

Patent Document 1: Japanese National-Phase Publication No. H3-501832

DISCLOSURE OF INVENTION

Technical Problem

In the above configuration wherein rotation of the output shafts is transmitted to the movable locations using flexible cables, there is room for improvement in terms of increasing productivity because the structure includes large number of peripheral components, and the effort is involved in attaching the cables.

In consideration of the above circumstances, a subject of the present invention is to provide a multi-shaft drive device capable of increasing productivity compared to previously.

Solution Addressing Subject

A multi-shaft drive device of a first aspect includes: an input portion to which power of a motor is transmitted; plural output portions, each of which is provided with an output shaft, the output shafts being individually connected to plural movable mechanisms; a clutch part capable of selectively disconnecting power transmission from the input portion to the plural output portions; and a gearbox that includes a power transmission member provided coaxially to the output shaft of at least one output portion out of the plural output portions, and that connects together the output shaft and the movable mechanism.

In the first aspect, the output shaft of at least one output portion out of the plural output portions is connected to the movable mechanism by the gearbox that includes the transmission member provided coaxially to the output shaft. The connection structure between the output shaft and a drive shaft of the movable mechanism can accordingly be made simpler than when employing a conventional cable for power transmission. Productivity can accordingly be increased due to assembly being made easier.

A multi-shaft drive device of a second aspect is the first aspect, wherein the power transmission member is integrally formed with the output shaft.

In the second aspect, the power transmission member provided to the gearbox is integrally formed with the output shaft provided at the output portion. Productivity can accordingly be further increased since the number of components and the number of component assembly processes can be reduced.

A multi-shaft drive device of a third aspect is either the first aspect or the second aspect, wherein the power transmission member includes a worm, and the gearbox includes a worm wheel that engages with the worm.

In the third aspect, the gearbox is configured including the worm and the worm wheel, namely including a worm gear, thereby enabling a large speed reduction ratio to be obtained in a single step by the worm gear. A reduction in the size of the device can accordingly be achieved.

A multi-shaft drive device of a fourth aspect is any one of the first aspect to the third aspect, further including: a device case integrally provided with: a clutch unit case portion housing the plural output portions, the input portion, and a clutch unit, the clutch unit including the clutch part; and a gearbox case portion housing the gearbox.

In the fourth aspect, it is possible to configure the device case as a single component because the device case is integrally providing with the gearbox case portion and the clutch unit case portion, the gearbox case portion housing the gearbox including the power transmission member and the clutch unit case portion housing the clutch unit. Productivity can accordingly be further increased since assembly can be made easy.

A multi-shaft drive device of a fifth aspect is any one of the first aspect to the fourth aspect, wherein the clutch part includes: plural clutch mechanisms that are respectively provided to each of the plural output portions, and that disconnect power transmission from the input portion to the output shafts; and a switching part for selectively placing the plural clutch mechanisms in a connected state.

In the fifth aspect, the plural clutch mechanisms respectively provided to each of the plural output portions can be selectively placed in the connected state by the switching part, thereby enabling power transmission from the input portion to the output shaft of the selected output portion. A reduction in size of the configuration of each clutch mechanism is accordingly enabled due to respectively providing the clutch mechanisms to each of the plural output portions, thereby enabling a reduction in the size of the device.

A multi-shaft drive device of a sixth aspect is the third aspect, wherein: an end portion of the worm is formed with a projection portion that is coaxial to the worm with a step portion interposed therebetween; the worm is coaxially inserted into a worm insertion hole that is formed in the gearbox case portion and that has a circular cylinder shaped inner peripheral face, and the worm is supported by a shaft bearing portion mounted in the worm insertion hole; a circular cylinder shaped face formed at an outer peripheral face of the shaft bearing portion makes contact with the inner peripheral face of the worm insertion hole, and a male thread portion formed at the outer peripheral face is screwed together with a female thread portion formed at the inner peripheral face, and the shaft bearing portion engages with the step portion in a state in which the projection portion is coaxially inserted inside the shaft bearing portion so as to be capable of sliding rotation.

In the sixth aspect, the circular cylinder face formed at the outer peripheral face of the shaft bearing portion makes contact with the circular cylinder shaped inner peripheral face of the worm insertion hole of the gearbox case portion, thereby positioning the shaft bearing portion coaxially to the worm insertion hole. The projection portion of the worm is inserted inside the shaft bearing portion so as to be coaxial to and capable of sliding rotation, whereby the worm is positioned with a high degree of precision in the worm radial direction. The step portion at the end portion of the worm engages with the shaft bearing portion, thereby positioning the worm with a high degree of precision in a worm thrust direction. A position in the thrust direction of the worm can be changed by adjusting an amount by which the cap is screwed into the worm insertion hole, enabling thrust direction adjustment of the worm to be performed. The worm can accordingly be positioned with a high degree of precision in both the thrust direction and the radial direction by employing a simple configuration.

A multi-shaft drive device of a seventh aspect is either the third aspect or the sixth aspect, wherein: a transmission shaft is configured with the output shaft formed at one end side of the transmission shaft and the worm formed at the other end side of the transmission shaft; the output portion is further provided with a gear having a slide shaft, the gear is formed with a gear portion at a leading end portion of the slide shaft; the slide shaft of the gear is mounted to the output shaft so as to be rotatable together as a unit with the output shaft and so as to be capable of sliding in a thrust direction with respect to the output shaft; and at least two positions that are separated in the axial direction of the transmission shaft are rotatably supported through shaft bearings by the gearbox case portion, and a leading end portion and the slide shaft of the gear are rotatably supported by the gearbox case portion through shaft bearings so as to be movable along the thrust direction.

In the seventh aspect, the slide shaft of the gear provided to the output portion is mounted to the output shaft provided to the transmission shaft so as to be rotatable together as a unit with the output shaft and so as to be capable of sliding in the thrust direction with respect to the output shaft. The transmission shaft is rotatably supported by the gearbox case portion through the shaft bearings at least at two positions separated in the axial direction of the transmission shaft, and the leading end portion and the slide shaft of the gear are rotatably supported by the gearbox case portion through the shaft bearings so as to be movable along the thrust direction. Since the leading end portion and slide shaft of the gear that slides with respect to the output shaft (transmission shaft) are supported by the gearbox case portion through the shaft bearings, the gear can be supported with sufficient support force. As a result, support of the gear can be stabilized, thereby enabling noise generation and damage to be prevented.

A multi-shaft drive device of an eighth aspect is the seventh aspect, wherein: an outside engagement portion formed at one, and an inside engagement portion formed at the other, of the output shaft and the slide shaft, slidably engage to each other such that the gear is mounted to the output shaft so as to be rotatable together as a unit with the output shaft and also capable of sliding in the thrust direction with respect to the output shaft, the outside engagement portion has a recessed and projected cross-section profile formed at an outer peripheral face along an axial direction of the one, and the inside engagement portion has a recessed and projected cross-section profile formed at an inner peripheral face along the axial direction of the other; and a clearance between the outside engagement portion and the inside engagement portion is set such that the slide shaft is movable in the radial direction thereof with respect to the output shaft within a preset range.

In the eighth aspect, the outside engagement portion of the output shaft and the inside engagement portion of the slide shaft of the gear engage with each other such that the gear is mounted to the output shaft so as to be capable of rotating together as a unit with the output shaft and also capable of sliding in the thrust direction with respect to the output shaft. In the present aspect, the clearance between the outside engagement portion and the inside engagement portion is set such that the slide shaft, namely the gear, is movable in the radial direction thereof with respect to the output shaft within a preset range. Accordingly, the gear and the transmission shaft can be supported on the plural shaft bearings and can engage with each other so as to be both rotatable together as a unit and slidable with respect to each other in the thrust direction even when there is a low degree of coaxiality between the gear side shaft bearings and the transmission shaft side shaft bearings. Since requirements of coaxiality for the plural shaft bearings can be reduced, manufacture can be made easier, and mass productivity can be increased.

A multi-shaft drive device of a ninth aspect is either the fifth aspect or the sixth aspect, wherein the gear is an output side bevel gear that enmeshes with an input side bevel gear provided to the input portion when the clutch part is connected.

In the ninth aspect, the output side bevel gear is mounted to the output shaft so as to be rotatable together as a unit with the output shaft and so as also be capable of sliding in the thrust direction with respect to the output shaft. The output side bevel gear enmeshes with the input side bevel gear provided to the input portion to place the clutch part in a connected state. The output side bevel gear moreover separates from the input side bevel gear to place the clutch part in a disconnected state. Namely, the clutch part can be connected or disconnected by projecting forward or retreating the output side bevel gear with respect to the input side bevel gear, thereby enabling the clutch art to be achieved with a simple configuration.

A multi-shaft drive device of a tenth aspect is any one of the first aspect to the ninth aspect, wherein the movable mechanisms actuate movable locations of a vehicle seat.

In the tenth aspect, a single motor can be used to selectively drive plural movable mechanisms provided to a vehicle seat, including for example a lifter mechanism that adjusts a height of a seat face, a reclining mechanism that adjusts an angle of a seatback (backrest portion), and a slide mechanism that adjusts a front-rear position of the seat.

Advantageous Effects of Invention

According to the present invention, the advantageous effect is exhibited of providing a multi-shaft drive device capable of increasing productivity compared to previously.

DESCRIPTION OF EMBODIMENTS

Explanation follows regarding an exemplary embodiment of the present invention with reference to drawings.

(1) Multi-Shaft Drive Device Configuration

Figure 1:
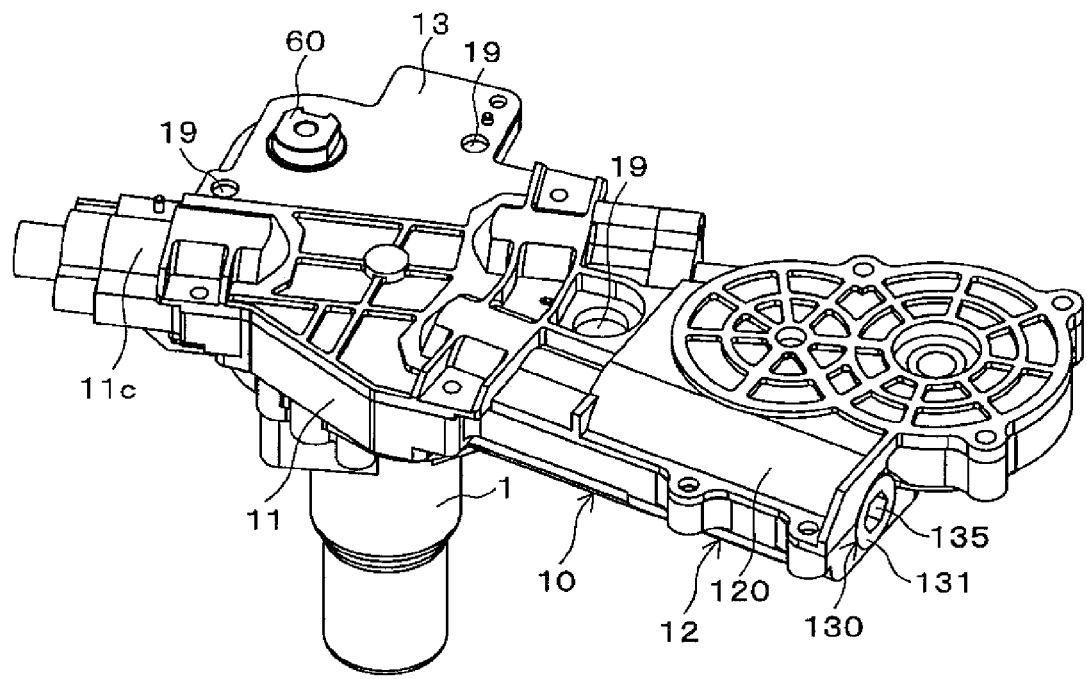
FIG. 1 is an overall perspective view illustrating a multi-shaft drive device according to a first exemplary embodiment of the present invention.

FIG. 1 is a perspective view illustrating a multi-shaft drive device according to an exemplary embodiment. The multi-shaft drive device selectively drives plural movable mechanisms of an electric seat in a vehicle, not illustrated in the drawings, with a single motor 1. In the present example, there are 3 movable mechanisms, namely a lifter mechanism that adjusts a height of a seat face, a reclining mechanism that adjusts an angle of a seatback (backrest portion), and a slide mechanism that adjusts a front-rear position of the seat. These movable mechanisms are actuated by forward and reverse rotation of drive shafts provided to each mechanism.

Figure 2:
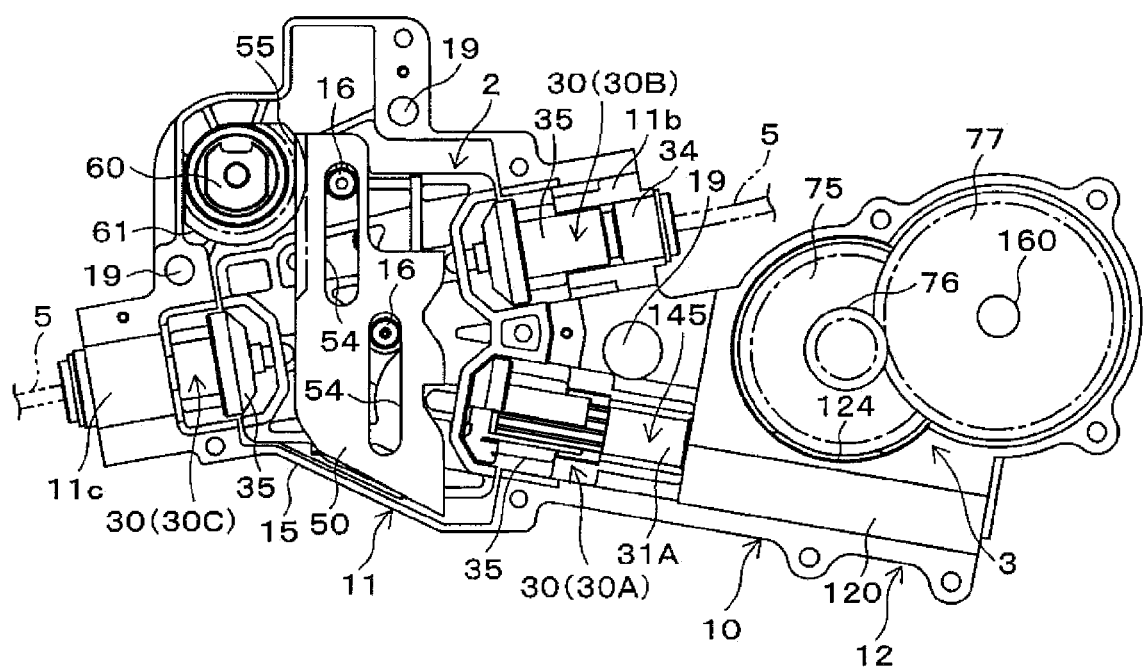
FIG. 2 is an overall plan view illustrating the multi-shaft drive device in a state with a cover removed.
Figure 3:
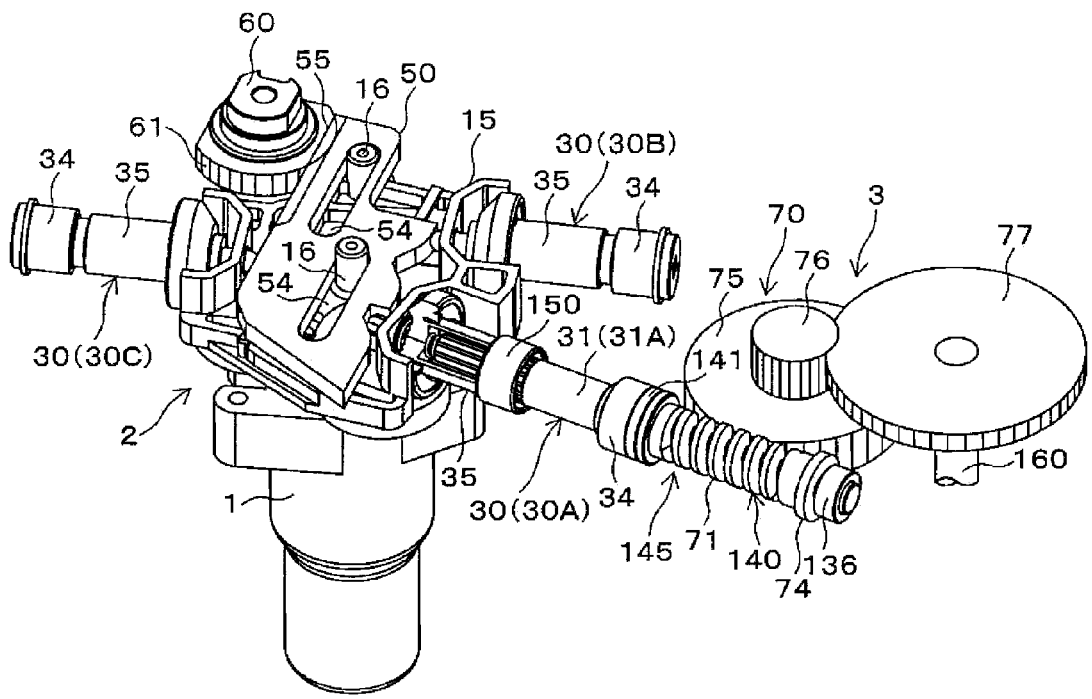
FIG. 3 is a perspective view illustrating the multi-shaft drive device in a state with a device case and the cover removed.
Figure 4:
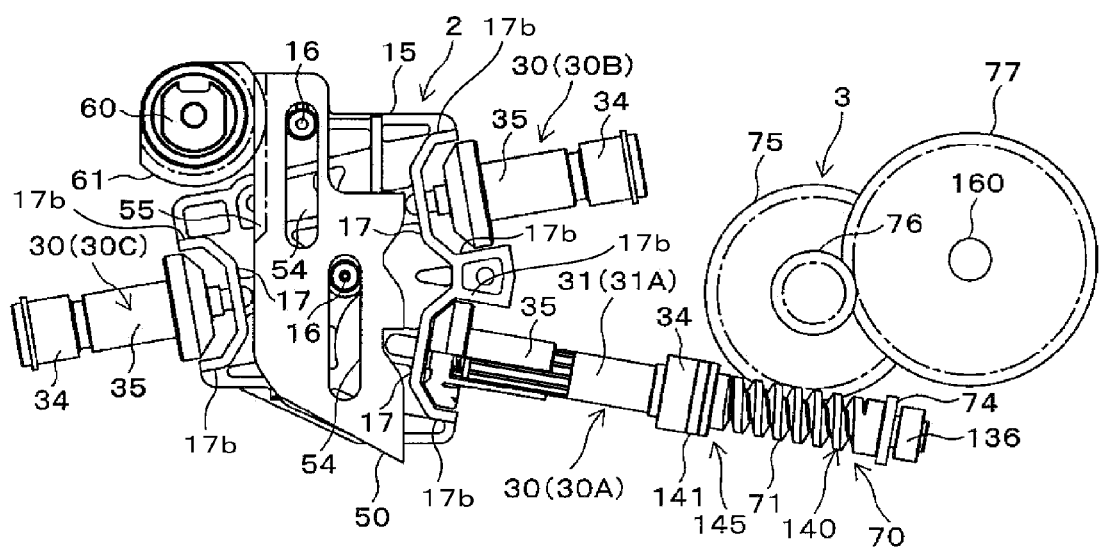
FIG. 4 is a plan view of FIG. 3.

A device case (case) 10 and a cover 13 that covers the device case 10 can be seen in FIG. 1. FIG. 2 is a plan view illustrating a removed state of the cover 13. FIG. 3 is a perspective view illustrating the inside of the device and the motor 1 with the device case 10 and the cover 13 removed, and FIG. 4 is a plan view corresponding to FIG. 3.

As illustrated in FIG. 2, the device case 10 includes a clutch unit case portion 11 and a gearbox case portion 12 to be molded integrally. The clutch unit case portion 11 and the gearbox case portion 12 respectively house a clutch unit 2 and a gearbox 3. The motor 1 is fixed to a back face of the clutch unit case portion 11 with a motor shaft 1a to which a pinion 1b is fixed in a state projecting inside the device case 10.

Figure 5A:
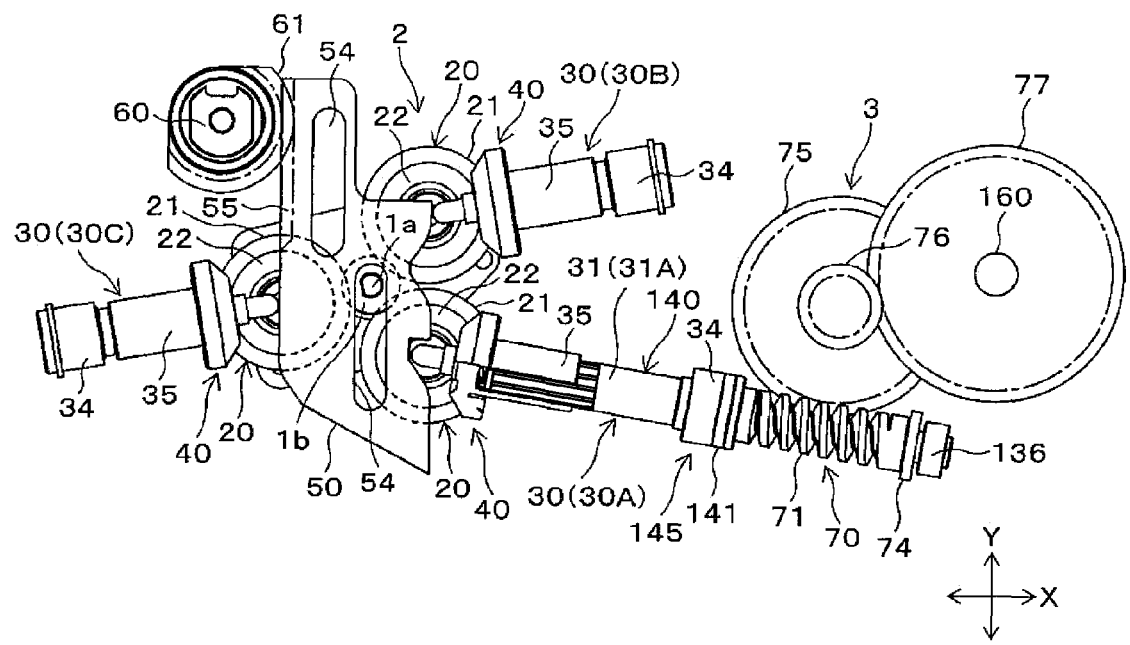
FIG. 5A is a plan view.
Figure 5B:
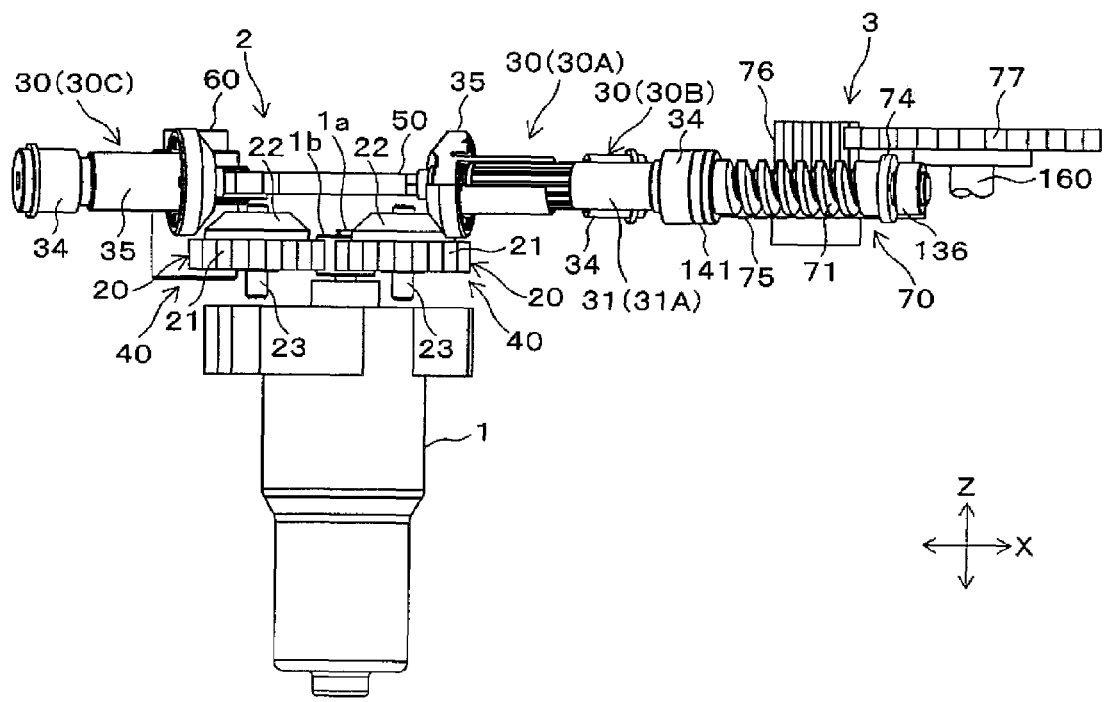
FIG. 5B is a side view, respectively illustrating a state in which a gear holder illustrated in FIG. 4 has been removed.

As illustrated in FIGS. 5, the clutch unit 2 includes: plural input portions 20 that transmit power of the motor 1, provided to each of the mechanisms described above; plural output portions 30 that are provided with output shafts 31 that connect to each of the mechanisms through power transmission member; clutch mechanisms 40 that are provided for each of the input portions 20 and the output portions 30, and that connect and disconnect the power transmission from the input portions 20 to each of the output shafts 31; a selector (switching portion) 50 that selectively places the clutch mechanisms 40 in a connected state; and an operation shaft 60 that actuates the selector 50.

The plural input portions 20 are disposed to the periphery of the pinion 1b. The input portions 20 are formed in circular plate shapes, and each includes an input gear 21 configured by a flattened cog that enmeshes with the pinion 1b and an input side bevel gear 22 formed on one end face of the input gear 21. The input gear 21 and the bevel gear 22 are formed coaxially to each other on an input shaft 23. The input portions 20 are rotatably supported on the clutch unit case portion 11 through the input shafts 23 that run along a Z direction parallel to the motor shaft 1a. Note that configuration may be made such that the input gear 21 and the input side bevel gear 22 are indirectly supported on the device case 10 through another member rather than being directly supported on the device case 10.

Figure 6:
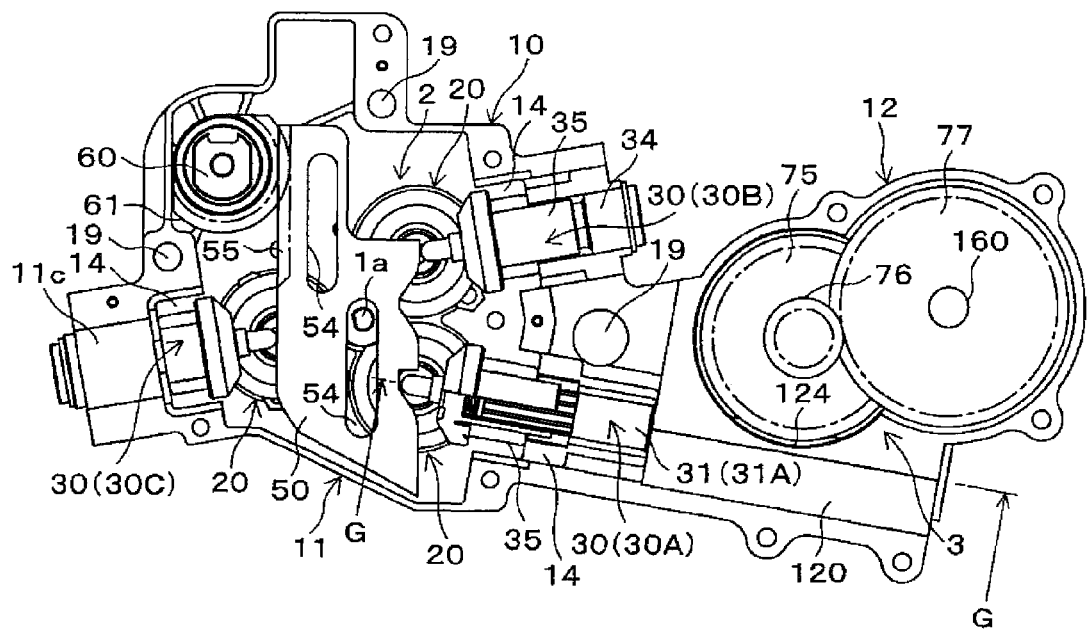
FIG. 6 is a drawing illustrating a state in which the gear holder illustrated in FIG. 2 has been removed.

A plate shaped gear holder 15 is illustrated in FIG. 4. As illustrated in FIG. 3, the gear holder 15 is fixed inside the clutch unit case portion 11 of the device case 10 so as to cover each of the input portions 20. Two guide projections 16 projecting in the Z direction are formed at specific locations of the gear holder 15. FIG. 6 is a plan view illustrating a state in which the gear holder 15 has been removed.

Figure 7:
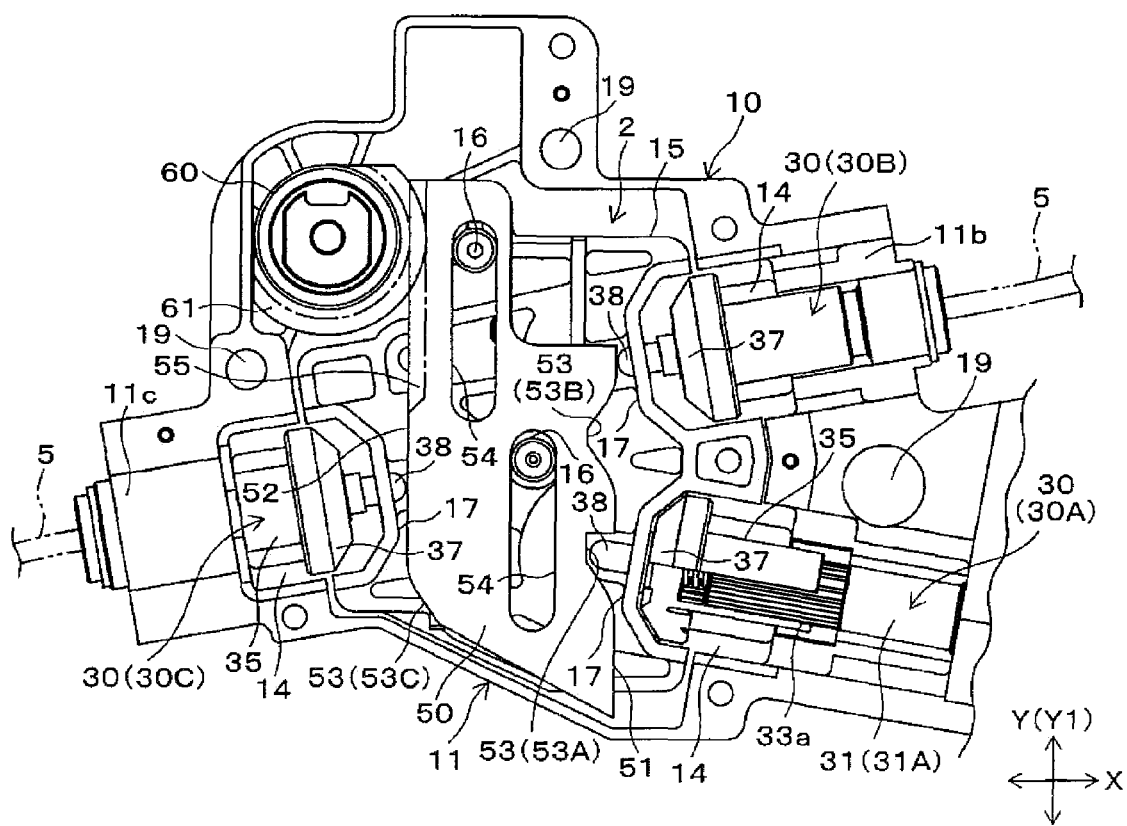
FIG. 7 is a plan view illustrating a clutch unit of the multi-shaft drive device.

FIG. 7 illustrates the clutch unit 2. As illustrated in FIG. 7, the selector 50 is a substantially rectangular plate shaped member that is long in the Y direction. The selector 50 is formed with two guide holes 54 corresponding to the guide projections 16 and extending in the Y direction. The respective guide projections 16 are inserted into the guide holes 54. The selector 50 is supported on the gear holder 15 so as to be capable of sliding in the Y direction guided by the guide projections 16.

Out of the two side faces of the selector 50 running in the Y direction, the side face on the right hand side in FIG. 7 is formed with a first cam face 51. A lower side of the side face on the left hand side is formed with a second cam face 52, and an upper side of the side face on the left hand side is formed with a rack 55 with a row of teeth running in the Y direction. The operation shaft 60 is rotatably supported inside the clutch unit case portion 11 with the rotation axis oriented in the Z direction. The operation shaft 60 is formed with a pinion 61 that enmeshes with the rack 55. An operation member such as a dial or a lever, not illustrated in the drawings, is fixed to the operation shaft 60 at the outside of the cover 13. When the operation shaft 60 is rotated through the operation member, the selector 50 is moved by the rotating pinion 61 back and forth along the Y direction through the rack 55, according to the rotation direction of the operation shaft 60.

The motor 1 is switched ON/OFF and rotation direction is selected by a switch, not illustrated in the drawings. All of the input portions 20 rotate when the motor 1 is actuated. The switch is preferably provided to the above operation member since this enables actuation of the clutch unit 2, namely selection of the movable mechanism, to be performed in a single operation together with the switching ON/OFF of the motor 1.

As illustrated in FIG. 7, the output portions 30 are disposed facing the respective cam faces 51, 52 on both X direction sides of the selector 50. In the present example, two of the output portions 30 (a first output portion 30A and a second output portion 30B) are disposed separated from each other in the Y direction facing the first cam face 51, and one of the output portions 30 (a third output portion 30C) is disposed facing the second cam face 52. The output portions 30 include the output shafts 31, and each of the output portions 30 is respectively housed in a housing portion 14 provided inside the clutch unit case portion 11 in a state in which the output shaft 31 thrust directions are parallel to an X-Y plane that is orthogonal to the Z direction, and the output shafts 31 are inclined at a specific angle with respect to the cam faces 51, 52.

As illustrated in FIGS. 8, each output portion 30 is configured by: the output shaft 31 positioned at a uniform distance from the selector 50; an output side bevel gear 35 on a leading end side (selector 50 side) of the output shaft 31 that is capable of rotating together as a unit with the output shaft 31, that is capable of projecting forwards or retreating along the output shaft 31 thrust direction with respect to the selector 50, and that is mounted coaxially to the output shaft 31; and a coil spring 39 that biases the output side bevel gear 35 to project forward in the direction of the selector 50.

The output shafts 31 are formed with a circular cylinder portion 33 at a leading end side of a large diameter portion 32. A flange 32A is formed at a rear end of the large diameter portion 32. As illustrated in FIG. 7, in the output shaft 31 of the third output portion 30C, the large diameter portion 32 is supported rotatably and in a thrust direction immovable state inside a circular cylinder shaped shaft bearing holder portion 11c formed in the clutch unit case portion 11 through a shaft bearing bush 34 (see FIG. 4). In the output shaft 31 of the second output portion 30B, the large diameter portion 32 is supported through the shaft bearing bush 34 in a rotatable and thrust direction immovable state due to being interposed between semicircular cylinder shaped shaft bearing holder portions respectively formed to the clutch unit case portion 11 and the cover 13 that configure a circular cylinder shape in a mounted state of the cover 13 to the device case 10. FIG. 7 illustrates a semicircular cylinder shaped shaft bearing holder portion 11b formed at a clutch unit case portion 11 side. The output shaft 31 of the first output portion 30A is rotatably supported inside a worm support portion 120, described later, formed at the clutch unit case portion 11.

Figure 8A:
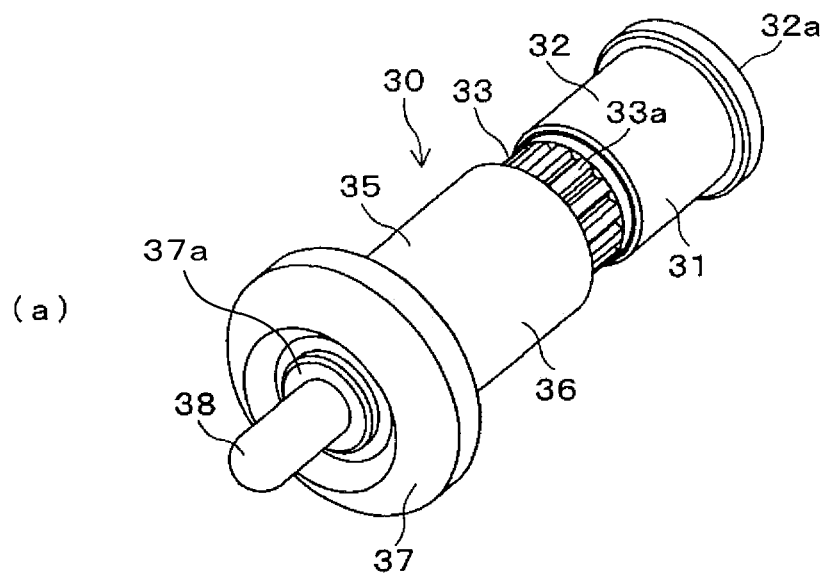
FIG. 8A is a perspective view.
Figure 8B:
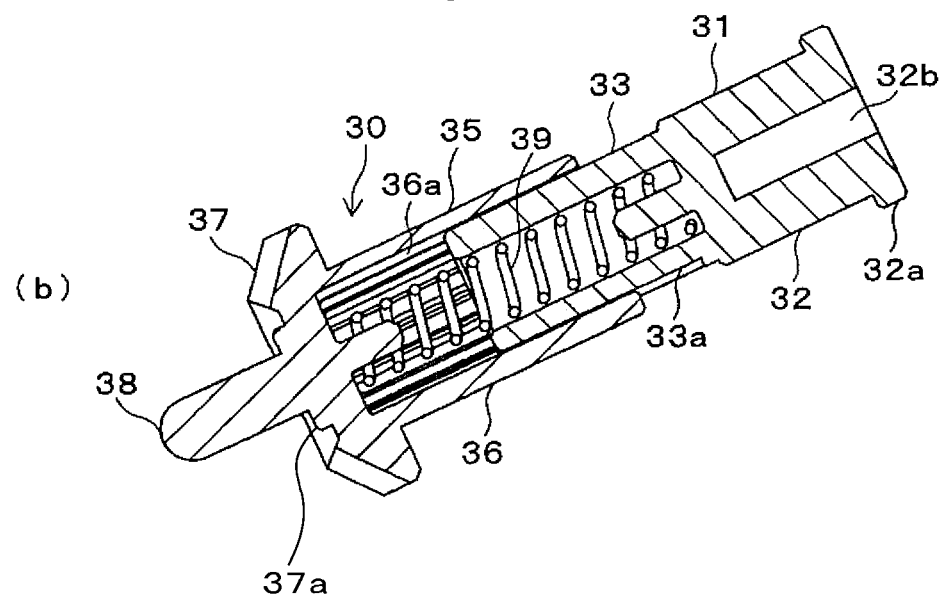
FIG. 8B is a cross-section, respectively illustrating an output portion of the multi-shaft drive device.

As illustrated in FIGS. 8A and 8B, the output side bevel gear 35 is configured by: a circular cylinder shaped slide shaft 36 that is externally mounted to an outer peripheral face of the circular cylinder portion 33 of the output shaft 31 such that relative rotation therebetween is not possible, namely such that the slide shaft 36 can rotate together as a unit with the circular cylinder portion 33, that is coaxially spline joined to the circular cylinder portion 33 so as to be capable of sliding in the thrust direction, and that is also capable of projecting forwards or retreating with respect to the selector 50 along the output shaft 31 thrust direction; a gear portion 37 that is integrally formed with a leading end side of the slide shaft 36 and that enmeshes with the input side bevel gear 22 of the input portion 20 when projecting forwards, and a pin 38 (contact portion) that projects out from the center of the gear portion 37. An outer peripheral side spline portion 33a and an inner peripheral side spline portion 36a that mutually engage with each other are respectively formed to the outer peripheral face of the circular cylinder portion 33 of the output shaft 31 and the inner peripheral face of the slide shaft 36 of the output side bevel gear 35. Namely, the outer peripheral side spline portion 33a of recessed and projected cross-section profile formed along the axial direction of the outer peripheral face of the circular cylinder portion 33, and the inner peripheral side spline portion 36a of recessed and projected cross-section profile formed along the axial direction of the inner peripheral face of the slide shaft 36 are slidably engaged with each other. The output side bevel gear 35 is accordingly mounted to the output shaft 31 such that the output side bevel gear 35 is rotatable together as a unit with the output shaft 31 and are slidable along the thrust direction.

In the present exemplary embodiment, the output side bevel gear 35 and the input side bevel gear 22 configure the clutch mechanism 40 according to the present invention.

The coil spring 39 is housed in a compressed state inside the circular cylinder portion 33 of the output shaft 31 and the slide shaft 36 of the output side bevel gear 35. The output side bevel gear 35 is biased in the selector 50 direction by the coil spring 39, and a leading end of the pin 38 abuts the cam faces 51, 52. The leading end face of the pin 38 is formed with a spherical face shape and makes sliding contact with the abutting cam faces 51, 52 when the selector 50 is moved in the Y direction.

As illustrated in FIG. 7, the first cam face 51 of the selector 50 is formed with recessed portions 53 (a first recessed portion 53A and a second recessed portion 53B) corresponding to the first output portion 30A and the second output portion 30B. The second cam face 52 is formed with a recessed portion 53 (a third recessed portion 53C) corresponding to the third output portion 30C. In the present example, the third recessed portion 53 refers to an inclined face continuing to a Y direction end portion of the selector 50. Configuration is made such that when the selector 50 is moved in the Y direction, the pin 38 of any one of the output portions 30 fits into the corresponding recessed portion 53.

Figure 9:
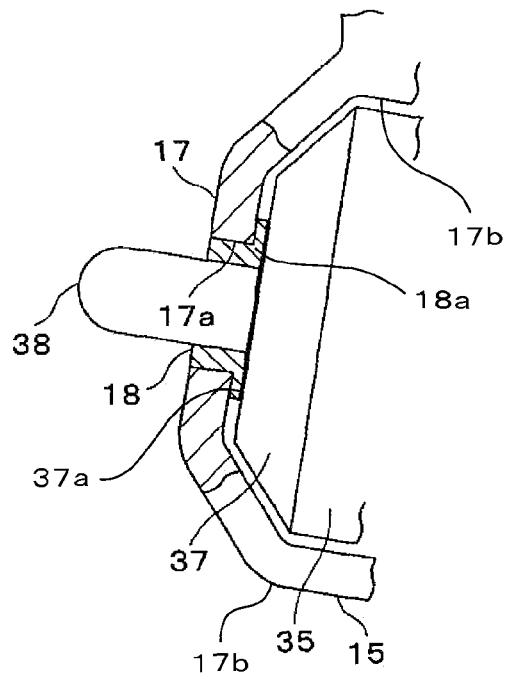
FIG. 9 is a partial cross-section plan view illustrating a support structure for a pin of an output side bevel gear of the multi-shaft drive device.

The overall output side bevel gear 35 slides in the direction of the selector 50 due to the pin 38 fitting into the recessed portion 53. When this occurs, the output side bevel gear 35 engages and enmeshes with the input side bevel gear 22, achieving a connected state of the clutch mechanism 40. As illustrated in FIG. 7 and FIG. 9, in each of the output portions 30, the pin 38 of the output side bevel gear 35 (a leading end portion of the output side bevel gear 35) penetrates a through hole 17a in a wall portion 17 formed to the gear holder 15. Shaft bearing bushes 18 (shaft bearings) are pushed into and fixed to the through holes 17a, and the pins 38 are supported inside the shaft bearing bushes 18 so as to capable of sliding rotation and movable in the thrust direction. When the clutch mechanism 40 is connected, a leading end face of the gear portion 37 of the output side bevel gear 35 contacts the wall portion 17, thereby restricting the stroke end of the output side bevel gear 35 when the output side bevel gear 35 is projecting forwards.

When the motor 1 is actuated and the input portion 20 rotates with the clutch mechanism 40 connected, the rotation is transmitted from the input side bevel gear 22 to the output side bevel gear 35, rotating the output side bevel gear 35. The rotation of the slide shaft 36 is transmitted to the output shaft 31, rotating the output shaft 31. In a state in which the pin 38 is abutting the cam face 51 (52) and not fitted into the recessed portion 53, the output side bevel gear 35 is pushed towards the output shaft 31 side against the coil spring 39 by the cam face 51 (52), resulting in a disconnected state of the clutch mechanism 40 in which the gear portion 37 is separated from the input side bevel gear 22.

The output shafts 31 of each of the output portions 30 are connected to the drive shafts of each of the movable mechanisms described above through the power transmission members. In the present exemplary embodiment, flexible torque cables 5 (see FIG. 2) serving as the power transmission members are connected to the output shafts 31 of the second output portion 30B and the third output portion 30C. The torque cable 5 on the second output portion 30B side is connected to the drive shaft of the reclining mechanism mentioned above, and the torque cable 5 on the third output portion 30C side is connected to the drive shaft of the slide mechanism mentioned above. The torque cables 5 are inserted into mounting holes 32b (see FIG. 8B) formed in rear end faces of the output shafts 31 of the second output portion 30B and the third output portion 30C so as to be capable of rotating together as a unit with the output shafts 31. When the output shafts 31 rotate in the clutch mechanism 40 connected state, the torque cables 5 rotate, respectively actuating the reclining mechanism and the slide mechanism.

As illustrated in FIG. 4, a worm gear 70 and a gear 77 serving as the power transmission members are connected to the output shaft 31 of the first output portion 30A. The worm gear 70 and the gear 77 configure the gearbox 3 mentioned above.

Figure 10:
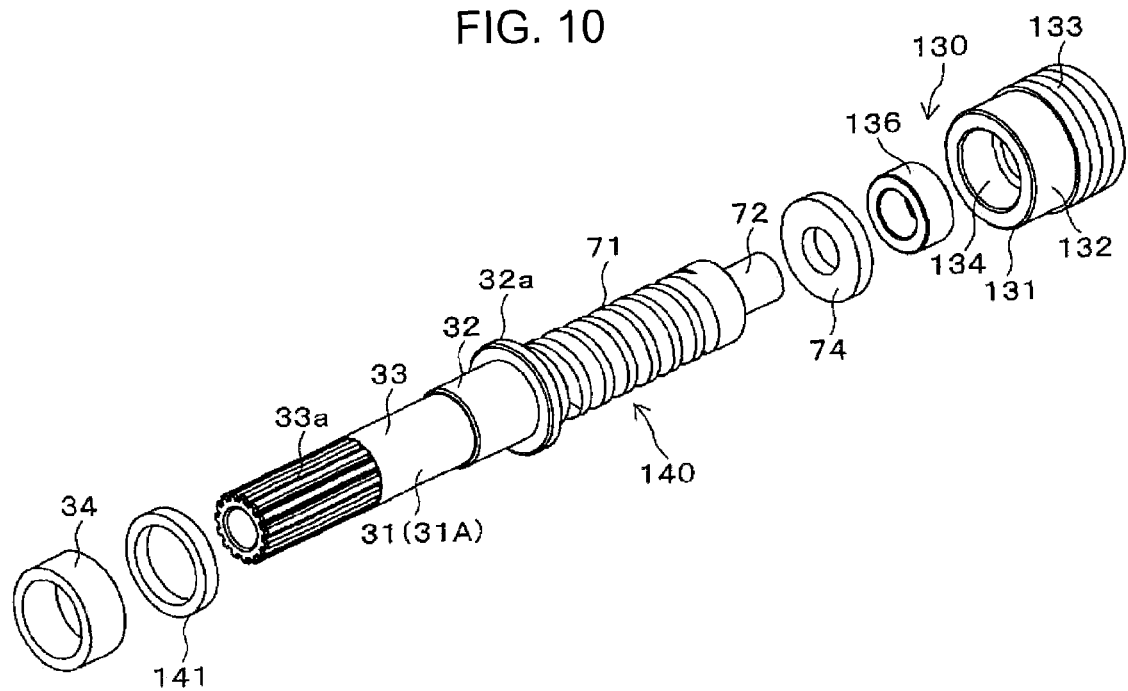
FIG. 10 is an exploded view illustrating members including a transmission shaft with a worm directly integrally formed with an output shaft, and a shaft bearing portion.
Figure 11:
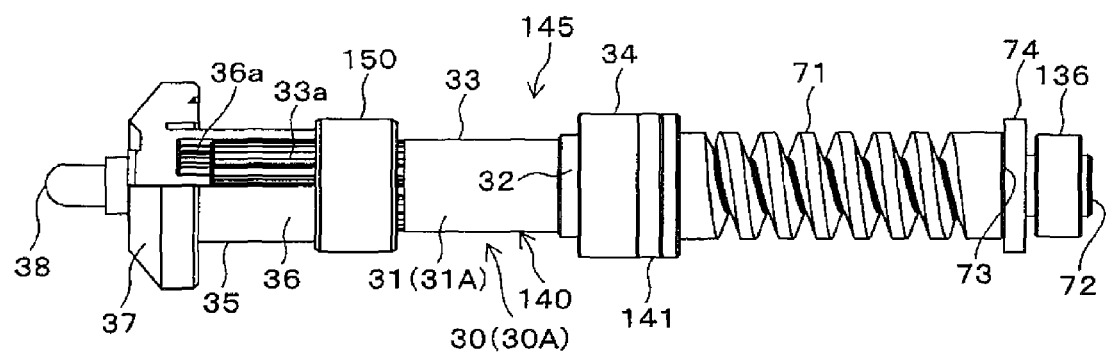
FIG. 11 is a side view illustrating a mounted state of an output side bevel gear to the transmission shaft.

As illustrated in FIG. 10 and FIG. 11, the worm gear 70 is configured including a worm 71 (power transmission members) formed coaxially and integrally to the rear end of the output shaft 31 (referred to below as the output shaft 31A) of the first output portion 30A, and a worm wheel 75 that enmeshes with the worm 71. Namely as illustrated in FIG. 10, the output shaft 31A and the worm 71 of the first output portion 30A are formed on a single circular column shaped transmission shaft 140. A flange 32a is formed at an intermediate portion of the transmission shaft 140. The output shaft 31, including the circular cylinder portion 33 formed with the large diameter portion 32 and the outer peripheral side spline portion 33a that is formed to the outer peripheral face, is formed on one end side of the flange 32a, and the worm 71 is formed on the other end side of the flange 32a.

Figure 12:
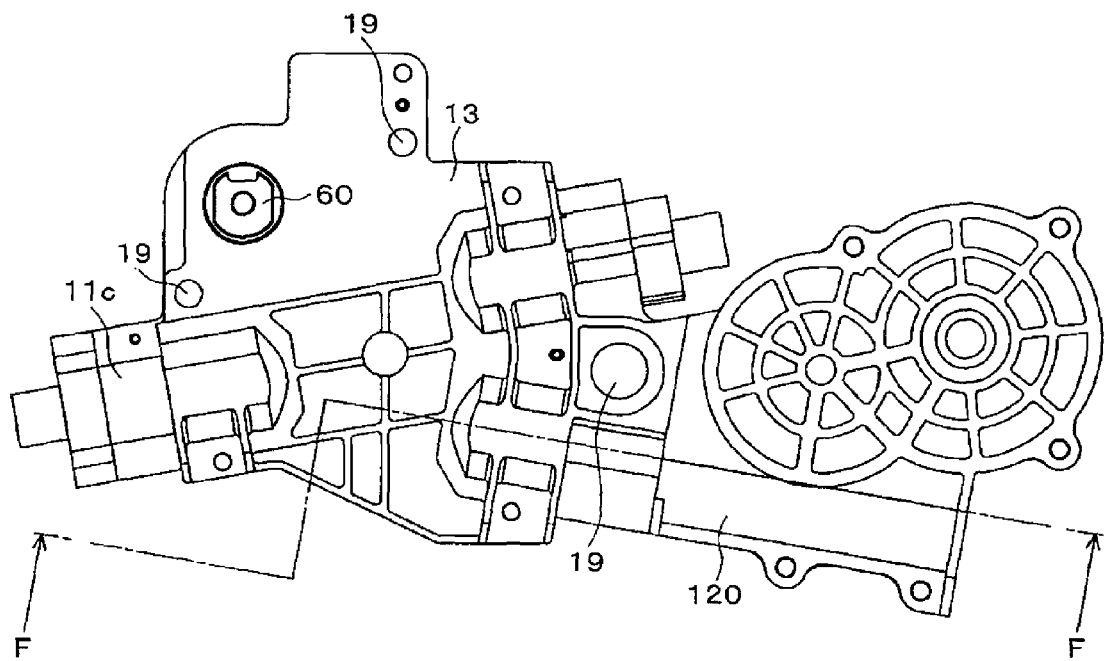
FIG. 12 is an overall plan view illustrating the multi-shaft drive device.
Figure 13:
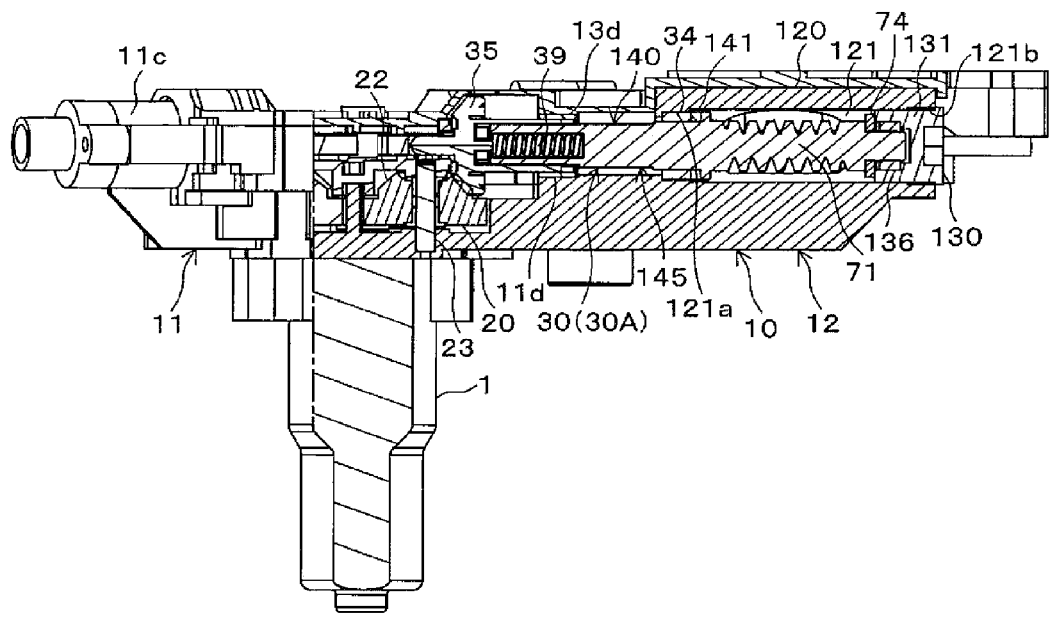
FIG. 13 is a cross-section taken along F-F in FIG. 12.
Figure 14:
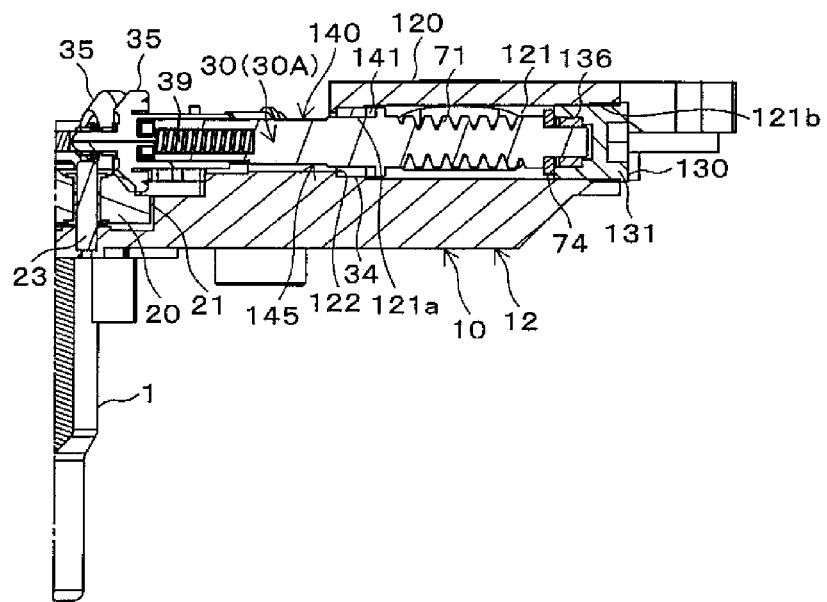
FIG. 14 is a cross-section taken along G-G in FIG. 6.

As illustrated in FIG. 12 and FIG. 13, the worm 71 is inserted into and rotatably supported in the circular cylinder shaped worm support portion 120 formed to the gearbox case portion 12. As illustrated in FIG. 14, a worm insertion hole 121 with a circular cylinder shaped inner peripheral face is formed inside the worm support portion 120. The worm insertion hole 121 is open at both ends. The circular cylinder shaped shaft bearing bush 34 (shaft bearing) is fitted into an opening portion 121a on one end side of the worm insertion hole 121 (the left hand side in FIG. 14: the clutch unit 2 side) so as to be coaxial to the worm insertion hole 121. The shaft bearing bush 34 contacts a ring shaped stopper step portion 122 formed on the one end side opening portion 121a, preventing the shaft bearing bush 34 from being pulled out of the opening portion 121a. The large diameter portion 32 of the output shaft 31A is supported inside the shaft bearing bush 34 so as to be capable of sliding rotation. A washer 141 is mounted interposed between the shaft bearing bush 34 and the flange 32a. The flange 32a engages with the stopper step portion 122 through the washer 141 and the shaft bearing bush 34, thereby restricting the overall transmission shaft 140 from moving towards the clutch unit 2 side.

A circular column shaped small diameter portion 72 of uniform diameter is formed coaxially to the worm 71 at a worm 71 side end portion of the transmission shaft 140 with a step portion 73 interposed therebetween. The small radius portion 72 is rotatably supported by a shaft bearing portion 130 that is mounted to an opening portion (referred to below as the insertion side opening portion) 121b on the other end side of the worm support portion 120.

Figure 15:
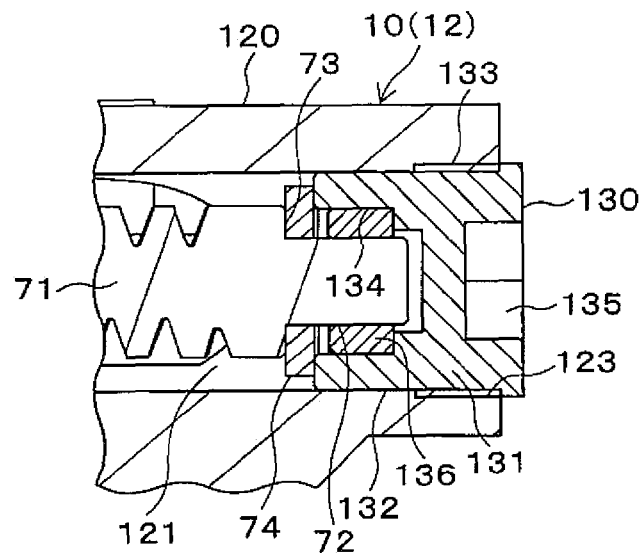
FIG. 15 is a cross-section illustrating a supported state of an end portion of a worm at a shaft bearing portion.

The inner diameter of the worm insertion hole 121 is set with a dimension that forms a uniform gap with respect to the worm 71. As illustrated in FIG. 15, the shaft bearing portion 130 is configured by a circular cylinder shaped cap 131 and a circular cylinder shaped shaft bearing bush 136 (shaft bearing) that is fixed to an inner peripheral portion at one end side of the cap 131. The one end side of the outer peripheral face of the cap 131 (outer peripheral face of the shaft bearing portion 130) is configured with a circular cylinder shaped face 132 that makes contact (face-to-face contact in the present example) with the inner peripheral face of the worm insertion hole 121. On the other end side of the outer peripheral face of the cap 131 (outer peripheral face of the shaft bearing portion 130), a male thread portion 133 of larger diameter than the circular cylinder face 132 is formed coaxially to the circular cylinder face 132. A circular cylinder face 132 side end face of the cap 131 is formed with a shaft bearing hole 134 that is coaxial to the circular cylinder face 132. The shaft bearing bush 136 is pushed into and fixed to the shaft bearing hole 134. The shaft bearing bush 136 is in a completely pushed in state inside the shaft bearing hole 134. A male thread portion 133 side end face of the cap 131 is formed with a hexagonal hole 135. An end portion at an insertion side opening portion 121b side of the worm insertion hole 121 is formed with a female thread portion 123 into which the male thread portion 133 is screwed. The shaft bearing bush 34, the circular cylinder face 132 and the male thread portion 133 that configure the outer peripheral face of the cap 131, the shaft bearing hole 134 of the cap 131, and the shaft bearing bush 136 are all coaxial to the worm insertion hole 121.

The shaft bearing portion 130 is mounted to the insertion side opening portion 121b of the worm support portion 120 by sliding the circular cylinder face 132 of the cap 131 into the insertion side opening portion 121b of the worm support portion 120 and screwing the male thread portion 133 into the female thread portion 123. The small radius portion 72 of the worm 71 is inserted into and supported inside the shaft bearing bush 136 so as to be capable of sliding rotation. Note that in the present exemplary embodiment, a washer 74 is inserted over the small radius portion 72, and the step portion 73 of the worm 71 engages with the cap 131 through the washer 74, thereby restricting the overall transmission shaft 140 from moving towards the direction opposite to the clutch unit 2. An intermediate portion of the worm support portion 120 is formed with a notch 124 that exposes a portion of the worm 71 so as to be capable of engaging with the worm wheel 75.

The transmission shaft 140 is set in the worm support portion 120 in the following manner. Firstly, the shaft bearing bush 34 and the washer 141 are mounted to the large diameter portion 32 of the output shaft 31A, and the coil spring 39 is loaded inside the circular cylinder portion 33 of the output shaft 31A. Then the transmission shaft 140 is inserted into the worm insertion hole 121 from the output shaft 31 side. The pin 38 is then inserted into the shaft bearing bush 18 that is fixed to the through hole 17a of the wall portion 17 of the gear holder 15, and the outer peripheral side spline portion 33a of the output shaft 31A is fitted into the inner peripheral side spline portion 36a of the output side bevel gear 35 that is housed in the housing portion 14. Next, after fitting the washer 74 onto the small radius portion 72, the circular cylinder face 132 of the cap 131 is inserted into the insertion side opening portion 121b, and the small radius portion 72 is inserted into the shaft bearing bush 136 whilst screwing the male thread portion 133 into the female thread portion 123.

The transmission shaft 140 that is rotatably supported by the worm support portion 120, and the output side bevel gear 35 that is mounted on the output shaft 31A of the transmission shaft 140, are thereby coupled together, configuring a compound gear 145 in which the output side bevel gear 35 is on a leading end side, the worm 71 is on a rear end side, and the output side bevel gear 35 is spline joined to the worm 71.

In the transmission shaft 140 of the compound gear 145, the small radius portion 72 at the rear end portion of the worm 71 is supported by the shaft bearing bush 136 of the shaft bearing portion 130, and the large diameter portion 32 of the output shaft 31A at the intermediate portion is supported by the shaft bearing bush 34 disposed in the one end side opening portion 121a of the worm support portion 120, such that the transmission shaft 140 is rotatable whilst being positioned in a radial direction. The amount by which the cap 131 is screwed into the female thread portion 123 can be adjusted by rotating the cap 131, enabling adjustment of the thrust direction position of the worm 71.

In the output side bevel gear 35 of the compound gear 145, the leading end pin 38 is supported by the shaft bearing bush 18 of the wall portion 17 of the gear holder 15, and a rear end portion of the slide shaft 36 is rotatably supported through a shaft bearing bush 150 (shaft bearing) illustrated in FIG. 11.

Figure 16:
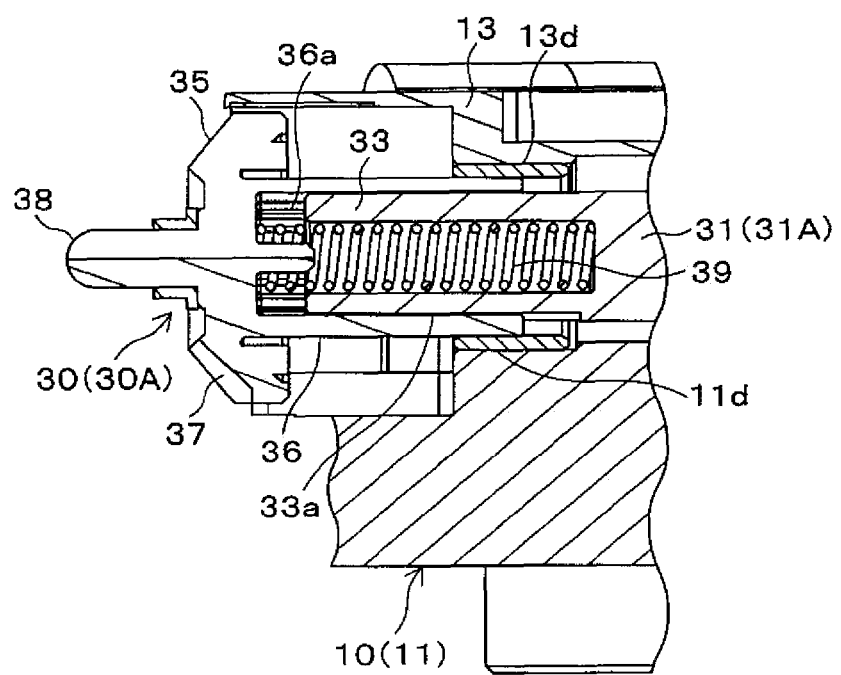
FIG. 16 is a cross-section illustrating a support structure of an output side bevel gear of a first output portion.

The shaft bearing bush 150 is retained interposed between a semicircular cylinder shaped shaft holder portion 11d formed at the clutch unit case portion 11 of the device case 10 and a shaft holder portion 13d formed at the cover 13, as illustrated in FIG. 16. In the output side bevel gear 35, the leading end pin 38 and the rear end portion of the slide shaft 36 are accordingly respectively supported by the shaft bearing bush 18 and the shaft bearing bush 150 so as to be capable of sliding rotation. The output side bevel gear 35 R can accordingly be positioned with respect to the radial direction thereof in a state of being supported at both ends thereof.

Namely, in the compound gear 145 in which the transmission shaft 140 with the integrated output shaft 31A and the worm 71 is spline joined to the output side bevel gear 35, the leading end pin 38 of the output side bevel gear 35, the rear end portion of the worm 71, the large diameter portion 32 at the rear end portion of the output shaft 31A, and the slide shaft 36 of the output side bevel gear 35 are each respectively supported in a state capable of sliding rotation by the shaft bearing bush 18, the shaft bearing bush 136, the shaft bearing bush 34, and the shaft bearing bush 150.

In the present exemplary embodiment, in this supported state the clearance between the outer peripheral side spline portion 33a of the output shaft 31A and the inner peripheral side spline portion 36a of the slide shaft 36 of the output side bevel gear 35 is set such that shaft misalignment between the transmission shaft 140 and the output side bevel gear 35 can be absorbed. In other words, the clearance between the respective spline portions 33a, 36a is set comparatively loosely such that the outer peripheral side spline portion 33a of the output shaft 31A can be fitted into the inner peripheral side spline portion 36a of the output side bevel gear 35 even when the output side bevel gear 35 that is supported by the shaft bearing bushes 18, 150 is not strictly coaxial to the transmission shaft 140 supported by the shaft bearing bushes 34, 136 due to low mutual coaxiality between the shaft bearing bushes 18, 150, 34, 136. Specifically, the clearance between the respective spline portions 33a, 36a is set relatively loosely such that the slide shaft 36 is able to move within a preset range in the radial direction with respect to the output shaft 31A.

As illustrated in FIG. 4, the gearbox 3 is configured by the worm gear 70 that includes the worm 71 and the worm wheel 75 that engages with the worm 71, and the gear 77. The worm wheel 75 is rotatably supported by the gearbox case portion 12. A small diameter gear 76 is formed at the center of the worm wheel 75. The small diameter gear 76 engages with the gear 77. The gear 77 is fixed to a drive shaft 160 of the lifter mechanism mentioned above that is orthogonal to the transmission shaft 140. When the output shaft 31A of the first output portion 30A rotates in the clutch mechanism 40 connected state, the gearbox 3 is actuated, whereby the worm 71 is rotated. This rotation is transmitted to the worm wheel 75, and the rotation of the worm wheel 75 is transmitted from the small diameter gear 76 to the gear 77. The drive shaft 160 of the lifter mechanism is thereby rotated, actuating the lifter mechanism.

In the multi-shaft drive device of the first exemplary embodiment described above, the multi-shaft drive device is fixed to a member such as a seat frame using plural screw insertion holes 19 provided to peripheral edges of the device case 10 and the cover 13.

(2) Multi-Shaft Drive Device Operation

The multi-shaft drive device described above operates as follows.

FIG. 7 illustrates a state in which the pin 38 of the output side bevel gear 35 of the first output portion 30A has been fitted into the first recessed portion 53A by rotating the operation shaft 60 to move the selector 50 in the Y direction. In this state, the output side bevel gear 35 of the first output portion 30A engages with the input side bevel gear 22 corresponding to the first output portion 30A, resulting in a connected state of the clutch mechanism 40. In the other output portions 30 (the second output portion 30B and the third output portion 30C), the pins 38 are pressed by the cam faces 51, 52 and the output side bevel gears 35 are separated from the corresponding input side bevel gears 22, such that the respective clutch mechanisms 40 are in a disconnected state.

From this state, when the selector 50 is moved a specific distance in the Y1 direction, the pin 38 of the second output portion 30B fits into the second recessed portion 53B, and the output side bevel gear 35 of the second output portion 30B enmeshes with the corresponding input side bevel gear 22, resulting in a connected state of the clutch mechanism 40. When this occurs, in the other output portions 30 (the first output portion 30A and the third output portion 30C), the pins 38 are pressed by the cam faces 51, 52, and the output side bevel gears 35 separate from the corresponding input side bevel gears 22, such that the respective clutch mechanisms 40 are in a disconnected state.

When the selector 50 is again moved a specific distance in the Y1 direction, the pin 38 of the third output portion 30C projects forward into the third recessed portion 53C, and the output side bevel gear 35 of the third output portion 30C enmeshes with the corresponding input side bevel gear 22, resulting in a clutch mechanism 40 connected state. When this occurs, in the other output portions 30 (the first output portion 30A and the second output portion 30B), the pins 38 are pressed by the cam face 51, and the output side bevel gears 35 separate from the corresponding input side bevel gears 22, such that the respective clutch mechanisms 40 are in a disconnected state.

The selector 50 is moved back and forth in the Y direction by forward and reverse rotation of the operation shaft 60. Along the path of this movement, the pins 38 project forwards into any one of the recessed portions 53A to 53C of the selector 50, such that when this occurs, one of the output portions 30 out of the first to third output portions 30A to 30C is selected as described above. The output side bevel gear 35 of the selected output portion 30 enmeshes with the corresponding input side bevel gear 22 to achieve the clutch mechanism 40 connected state.

In this connected state of the clutch mechanism 40, when the switch is switched ON and the motor 1 is actuated, the power of the motor 1 is transmitted from the input side bevel gear 22 to the output side bevel gear 35, rotating the output shaft 31. In the second output portion 30B and the third output portion 30C, the rotation of the output shaft 31 is transmitted to the drive shafts of the reclining mechanism and the slide mechanism through the torque cables 5, actuating the reclining mechanism and the slide mechanism. In the first output portion 30A, the rotation of the output shaft 31A is transmitted to rotate the drive shaft 160 of the lifter mechanism through the gearbox 3, namely through the worm 71, the worm wheel 75, the small diameter gear 76 and the gear 77, actuating the lifter mechanism. The rotation direction of the output shafts 31 and the drive shafts of the movable mechanisms can be switched by switching the rotation direction of the motor 1 using the switch.

(3) Advantageous Effects of the Exemplary Embodiment

In the exemplary embodiment described above, out of the plural output portions 30, in the second output portion 30B and the third output portion 30C, the power transmission members for transmitting rotation of the output shaft 31 to the movable mechanisms are the conventional torque cables 5. However in the first output portion 30A, the worm 71 is directly connected to the output shaft 31A, with the power transmission members configured by the gearbox 3 including the worm 71, the worm gear 70 and the gear 77.

In the first output portion 30A, the torque cable 5 and a member to support the torque cable 5 are not required, with a connection structure between the output shaft 31 and the drive shaft 160 of the movable mechanism being simpler than previously. Accordingly, the advantageous effects are exhibited whereby assembly is made easier, increasing productivity, and it is possible to reduce the number of components, thereby enabling a reduction in costs. Moreover, in the first output portion 30A, the effort of attaching a torque cable 5 can be avoided, this also enabling productivity to be increased.

Moreover, in the above exemplary embodiment, the worm 71 provided to the gearbox 3 is integrally formed with the output shaft 31A. A further improvement in productivity is accordingly possible since the number of component assembly steps and the number of components can be reduced.

In the above exemplary embodiment, the device case 10 is integrally provided with the gearbox case portion 12 for housing the gearbox 3 that includes the worm 71, and the clutch unit case portion 11 for housing the clutch unit 2. The device case can therefore be configured as a single component. Assembly is accordingly made even easier and productivity is further increased, and a further reduction in the number of components is possible, enabling an even further reduction in costs to be achieved.

When the gearbox case portion 12 and the clutch unit case portion 11 are configured by separate bodies, the number of screw insertion holes in the gearbox case portion 12 that configure a fixing portion to a member such as a seat frame is relatively small, however by forming the gearbox case portion 12 integrally with the clutch unit case portion 11, the number of the screw insertion holes 19 increases, with the advantage of increasing rigidity in a fixed state.

In the present exemplary embodiment, the shaft bearing bush 34 that supports the rear end portion of the output shaft 31A also functions as a shaft bearing supporting the worm 71, thereby acting as a common shaft bearing. Productivity is accordingly further increased, and a reduction in costs is made possible.

In the present exemplary embodiment, in the structure wherein the worm 71 of the worm gear 70 is inserted into and supported by the worm insertion hole 121 inside the worm support portion 120, the small radius portion 72 of the worm 71 is inserted into the shaft bearing bush 136 of the shaft bearing portion 130 that is mounted coaxially to the worm insertion hole 121 so as to be capable of sliding rotation. The output shaft 31A is thereby supported by the shaft bearing bush 34, and positioning in a radial direction of the worm 71 is performed with high precision. The step portion 73 of the worm 71 engages with the cap 131 of the shaft bearing portion 130, such that positioning in a thrust direction of the worm 71 is performed with high precision. The worm 71 can be adjusted in the thrust direction by adjusting the amount by which the cap 131 is rotated and screwed into the female thread portion 123.

The shaft bearing portion 130 is configured simply by fixing the shaft bearing bush 136 to the cap 131, and the shaft bearing portion 130 is easily mounted to the worm insertion hole 121 by screwing the cap 131 into the worm insertion hole 121. The worm 71 is accordingly supported inside the worm insertion hole 121 by simply inserting the small radius portion 72 at the end portion of the worm 71 into the shaft bearing bush 136 of the shaft bearing portion 130. High precision positioning for the worm 71 in both the thrust direction and the radial direction is accordingly achieved with a simple structure.

In the present exemplary embodiment, in the compound gear 145 in which the slide shaft 36 of the output side bevel gear 35 is spline joined to the output shaft 31A of the transmission shaft 140, the transmission shaft 140 is rotatably supported by the gearbox case portion 12 through the shaft bearing bushes 34, 136 at two positions separated from each other in the axial direction. The pin 38 (leading end portion) and the slide shaft 36 of the output side bevel gear 35 are supported by the gearbox case portion 12 through the shaft bearing bushes 18, 150 so as to be rotatable and capable of moving in the thrust direction. The pin 38 and the slide shaft 36 of the output side bevel gear 35 that slides with respect to the output shaft 31A (transmission shaft 140) is therefore supported on the gearbox case portion 12 through the shaft bearing bushes 18, 150, enabling the output side bevel gear 35 to be supported with a sufficient support force. As a result, support of the output side bevel gear 35 can be stabilized, enabling noise generation and damage to be prevented.

Moreover, in the present exemplary embodiment, the clearance between the outer peripheral side spline portion 33*a* and the inner peripheral side spline portion 36*a* is set relatively loosely, such that the slide shaft 36, namely the output side bevel gear 35, is capable of moving in the radial direction within a preset range with respect to the output shaft 31A. Namely the clearance between the outer peripheral side spline portion 33*a* of the output shaft 31A and the inner peripheral side spline portion 36*a* of the slide shaft 36 of the output side bevel gear 35 is set relatively loosely so as to be able to absorb shaft misalignment between the transmission shaft 140 and the output side bevel gear 35. The output shaft 31A of the transmission shaft 140 can accordingly be spline joined to the output side bevel gear 35 even when there is a low degree of mutual coaxiality between the shaft bearing bushes 18, 150 of the output side bevel gear 35 and the shaft bearing bushes 34, 136 of the transmission shaft 140. The coaxiality between the shaft bearing bushes 18, 150, 34, 136 therefore does not need to be maintained with high precision, making manufacture easier and increasing the productivity in mass production as a result.

In the present exemplary embodiment, the gearbox 3 is configured including the worm 71, enabling a large speed reduction ratio to be obtained in a single step by the worm 71. A reduction in the size of the device can accordingly be achieved.

In the present exemplary embodiment, the plural clutch mechanisms 40 provided for each of the plural output portions 30 can selectively be placed in the connected state by the selector 50, enabling the selected output portion 30 to transmit power from the input portion 20 to the output shaft 31. Due to providing the clutch mechanisms 40 for each of the plural output portions 30, a smaller configuration can be achieved for each of the clutch mechanisms 40, enabling a reduction in the size of the device.

In the present exemplary embodiment, the output side bevel gears 35, that are mounted so as to be capable of rotating as a unit together with the output shafts 31A and also be capable of sliding in the thrust direction with respect to the output shafts 31A, mutually enmesh with the input side bevel gears 22 provided to the input portions 20 to achieve the clutch mechanism 40 connected state. The clutch mechanism 40 achieves the disconnected state when the output side bevel gear 35 separates from the input side bevel gear 22. Namely the clutch mechanisms 40 can be connected and disconnected by making the output side bevel gears 35 project forwards or retreat with respect to the input side bevel gears 22, enabling a simple configuration for the clutch mechanisms 40.

(4) Supplementary Explanation of the Exemplary Embodiment

In the exemplary embodiment described above, explanation has been given wherein the clutch mechanisms 40 are configured by the input side bevel gears 22 and the output side bevel gears 35, however the present invention is not limited thereto, and appropriate modifications may be made to the configuration of the clutch mechanism. For example, configuration may be made wherein an input side clutch member including an input portion and an output side clutch member including an output portion are connected together by frictional force.

In the exemplary embodiment described above, explanation has been given wherein the clutch mechanism is configured by plural clutch mechanisms 40 provided to each of the plural output portions 30 and the selector 50, however the present invention is not limited thereto, and appropriate modifications may be made to the configuration of the clutch mechanism. For example, configuration may be made wherein a rotating body (such as a gear) supported so as to be capable of movement with respect to the device case is selectively interposed between plural output portions and plural input portions and the output portions and the input portions are connected to each other by the rotating body.

In the exemplary embodiment described above, configuration is made wherein the outer peripheral side spline portion 33a of the output shaft 31A and the inner peripheral side spline portion 36a of the slide shaft 36 of the output side bevel gear 35 (gear) are engaged so as to be capable of sliding movement against each other, however appropriate modifications may be made to the engagement structure between the output shaft and the slide shaft of the gear. For example, configuration may be made wherein one out of an output shaft and a slide shaft is formed with a polygonal cross-section profile, and an inner peripheral face of the other out of the output shaft and the slide shaft is formed with a polygonal cross-section profile that engages with the polygonal outer peripheral face of the other so as to be capable of sliding movement along the axial direction.

In the exemplary embodiment described above, configuration is made wherein the clearance between the outer peripheral side spline portion 33a (outside engagement portion) and the inner peripheral side spline portion 36a (inside engagement portion) is set relatively loosely to allow radial direction movement of the slide shaft 36 with respect to the output shaft 31A within a preset range, however the present invention is not limited thereto. Configuration may be made wherein the clearance between the outside engagement member and the inside engagement member is set so as to be tight.

In the exemplary embodiment described above, the output portion 30 is provided with the output shaft 31 and the output side bevel gear 35, however the present invention is not limited thereto, and appropriate modifications may be made to the configuration of the output portion.

In the exemplary embodiment described above, the transmission shaft 140 is supported on the gearbox case portion 12 through the shaft bearing bushes 34, 136 at two positions separated in the axial direction, and the pin 38 and the slide shaft 36 of the output side bevel gear 35 (gear) are supported on the gearbox case portion 12 through the shaft bearing bushes 18, 150, however the present invention is not limited thereto, and appropriate modifications may be made to the support structure of the transmission shaft and the gear on the gearbox case.

In the exemplary embodiment described above, explanation has been given wherein the shaft bearing portion 130 is configured by the cap 131 and the shaft bearing bush 136, however the present invention is not limited thereto, and appropriate modifications may be made to the configuration of the shaft bearing portion. For example, configuration may be made wherein the shaft bearing bush 136 of the above exemplary embodiment is omitted, and the small radius portion 72 of the worm 71 is directly inserted inside the cap 131.

In the exemplary embodiment described above, configuration is made wherein the shaft bearing portion 130 engages with the step portion 73 of the worm 71 in a state in which the circular cylinder shaped face 132 formed to the outer peripheral face of the cap 131 of the shaft bearing portion 130 contacts the inner peripheral face of the worm insertion hole 121, the male thread portion 133 formed to the outer peripheral face of the cap 131 is screwed into the female thread portion 123 formed to the inner peripheral face of the worm insertion hole 121, and the small radius portion 72 of the worm 71 is coaxially inserted into the shaft bearing bush 136 so as to be capable of sliding rotation therewith. The present invention is however not limited thereto, and appropriate modifications may be made to the support structure of the worm 71.

Moreover in the exemplary embodiment described above, the gearbox 3 includes the worm 71 and the worm wheel 75, however the present invention is not limited thereto, and appropriate modifications may be made to the configuration of the gearbox. For example, the gearbox may only be provided with plural flattened cogs. The power transmission member includes flattened cogs in such a configuration.

In the exemplary embodiment described above, the device case 10 is integrally provided with the clutch unit case portion 11 and the gearbox case portion 12, however the present invention is not limited thereto. Configuration may be made wherein the clutch unit case portion and the gearbox case portion are formed as separate bodies and integrally coupled together using fasteners or the like.

In the exemplary embodiment described above, the output shaft 31 and the worm 71 are formed integrally to each other, however the present invention is not limited thereto configuration may be made wherein the output shaft and the worm are formed as separate bodies and coaxially and integrally coupled or joined together.

In the exemplary embodiment described above, configuration is made including the plural input portions 20, however the present invention is not limited thereto, and configuration may be made to switch a connected state between a single input portion and plural output portions.

In the exemplary embodiment described above, explanation has been given wherein the multi-shaft drive device is applied so as to selectively drive plural movable mechanisms in an electric seat in a vehicle, however there is no limitation thereto and the multi-shaft drive device of the present invention may be applied to various machines to which plural movable mechanisms are provided.

Various other modifications may be implemented within a range not departing from the spirit of the present invention. There is obviously no limitation of the scope of rights of the present invention to the exemplary embodiment described above.

What is claimed is:

1. A multi-shaft drive device comprising:
   an input portion to which power of a motor is transmitted;
   a plurality of output portions, each of which is provided with an output shaft, the output shafts being individually connected to a plurality of movable mechanisms;
   a clutch part capable of selectively disconnecting power transmission from the input portion to the plurality of output portions; and
   a gearbox that includes a power transmission member provided coaxially to the output shaft of at least one output portion out of the plurality of output portions, and that connects together the output shaft and the movable mechanism,
   wherein at least three output portions are provided at the multi-shaft drive device, and
   the input portion and the output portions are configured to be connected to and separated from each other such that power transmission is selectively performed, and
   wherein the power transmission member is integrally formed with the output shaft.

2. The multi-shaft drive device of claim 1, wherein the power transmission member includes a worm, and the gearbox includes a worm wheel that engages with the worm.

3. The multi-shaft drive device of claim 2, wherein:
   a transmission shaft is configured with the output shaft formed at one end side of the transmission shaft and the worm formed at the other end side of the transmission shaft;
   the output portion is further provided with a gear having a slide shaft, the gear being formed with a gear portion at a leading end portion of the slide shaft;
   the slide shaft of the gear is mounted to the output shaft so as to be rotatable together as a unit with the output shaft and so as to be capable of sliding in a thrust direction with respect to the output shaft; and
   at least two positions that are separated in the axial direction of the transmission shaft are rotatably supported through shaft bearings by the gearbox case portion, and a leading end portion and the slide shaft of the gear are rotatably supported by the gearbox case portion through shaft bearings so as to be movable along the thrust direction.

4. The multi-shaft drive device of claim 3, wherein:
   an outside engagement portion formed at one, and an inside engagement portion formed at the other, of the output shaft and the slide shaft, slidably engage to each other such that the gear is mounted to the output shaft so as to be rotatable together as a unit with the output shaft and also capable of sliding in the thrust direction with respect to the output shaft, the outside engagement portion having a recessed and projected cross-section profile formed at an outer peripheral face along an axial direction of the one, the inside engagement portion having a recessed and projected cross-section profile formed at an inner peripheral face along an axial direction of the other; and
   a clearance between the outside engagement portion and the inside engagement portion is set such that the slide shaft is movable in the radial direction thereof with respect to the output shaft within a preset range.

5. The multi-shaft drive device of claim 3, wherein the gear is an output side bevel gear that enmeshes with an input side bevel gear provided at the input portion when the clutch part is connected.

6. The multi-shaft drive device of claim 1, further comprising a device case integrally provided with:
   a clutch unit case portion housing the plurality of output portions, the input portion, and a clutch unit, the clutch unit including a plurality of clutch parts; and
   a gearbox case portion housing the gearbox.

7. The multi-shaft drive device of claim 6, wherein:
   an end portion of the worm is formed with a projection portion that is coaxial to the worm with a step portion interposed therebetween;
   the worm is coaxially inserted into a worm insertion hole that is formed in the gearbox case portion and that has a circular cylinder shaped inner peripheral face, and the worm is supported by a shaft bearing portion mounted in the worm insertion hole;
   a circular cylinder shaped face formed at an outer peripheral face of the shaft bearing portion makes contact with the inner peripheral face of the worm insertion hole, and a male thread portion formed at the outer peripheral face is screwed together with a female thread portion formed at the inner peripheral face, and the shaft bearing portion engages with the step portion in a state in which the projection portion is coaxially inserted inside the shaft bearing portion so as to be capable of sliding rotation.

8. The multi-shaft drive device of claim 6, wherein a worm side end portion of the power transmission member is supported by a shaft bearing portion that is mounted in a worm insertion hole that is formed in the gearbox case portion.

9. The multi-shaft drive device of claim 1, wherein the clutch part comprises:
   a plurality of clutch mechanisms that are respectively provided to each of the plurality of output portions, and that disconnect power transmission from the input portion to the output shafts; and
   a switching part for selectively placing the plurality of clutch mechanisms in a connected state.

10. The multi-shaft drive device of claim 1, wherein the movable mechanisms actuate movable portions of a vehicle seat.

* * * * *